United States Patent [19]

Kempas

[11] Patent Number: 4,592,242
[45] Date of Patent: Jun. 3, 1986

[54] DYNAMICALLY TUNED GIMBAL SUSPENSION WITH FLEXURAL PIVOTS FOR A TWO-DEGREE-OF-FREEDOM GYRO

[75] Inventor: Hagen Kempas, Überlingen, Fed. Rep. of Germany

[73] Assignee: Bodenseewerk Gerätetechnik GmbH, Überlingen, Fed. Rep. of Germany

[21] Appl. No.: 484,134

[22] Filed: Apr. 12, 1983

[30] Foreign Application Priority Data

Apr. 14, 1982 [DE] Fed. Rep. of Germany ....... 3213720

[51] Int. Cl.$^4$ .............................................. G01C 19/22
[52] U.S. Cl. ........................................ 74/5 F; 463/119
[58] Field of Search ............................ 74/5 F; 464/78; 308/2 A

[56] References Cited

U.S. PATENT DOCUMENTS

| | | | |
|---|---|---|---|
| 3,288,541 | 11/1966 | Tracy | 308/2 A |
| 3,585,866 | 6/1971 | Ensinger | 464/78 X |
| 3,678,764 | 7/1972 | Erdley et al. | 74/5 F |
| 3,700,290 | 10/1972 | Ensinger | 308/2 A |
| 3,856,366 | 12/1974 | Weisbord et al. | 74/5 F X |
| 4,269,072 | 5/1981 | Duncan | 74/5 F |
| 4,380,108 | 4/1983 | Craig | 29/434 |
| 4,464,942 | 8/1984 | Krupick | 74/5 F |

FOREIGN PATENT DOCUMENTS

| | | |
|---|---|---|
| 1281216 | 10/1969 | Fed. Rep. of Germany . |
| 1947893 | 12/1973 | Fed. Rep. of Germany . |
| 2150604 | 1/1974 | Fed. Rep. of Germany . |
| 2429913 | 2/1975 | Fed. Rep. of Germany . |

*Primary Examiner*—Rodney H. Bonck
*Attorney, Agent, or Firm*—Lee, Smith & Zickert

[57] ABSTRACT

A gimbal (108) on the driving side and a gimbal (106) on the rotor side and a gimbal arrangement with two gimbals (22,76) are formed by two coaxial, cylindrical rings (10,64) wherein peripheral cuts (12,14,16,18 and 66,68,70,72, respectively), having ends forming angles are provided in the rings. The peripheral cuts separate the portions of the gimbals (108,106) from the gimbals (22,76). The ends form leaf springs (for example 60 and 100), which form flexural pivots. One leaf spring (60) is connected to the gimbal (108) on the driving side and the other leaf spring is connected to the gimbal (106) on the driven side. The cuts are produced by electroerosion.

3 Claims, 8 Drawing Figures

DYNAMICALLY TUNED GIMBAL SUSPENSION WITH FLEXURAL PIVOTS FOR A TWO-DEGREE-OF-FREEDOM GYRO

The invention relates to a dynamically tuned gimbal suspension with flexural pivots for a two-degree-of-freedom gyro, comprising:
(a) a gimbal on the driving side,
(b) a gimbal on the rotor side and
(c) a gimbal arrangement connected to the gimbal on the driving side and to the gimbal on the rotor side through a first pair of diametrically opposite flexural pivots, on one hand, and through a second pair of diametrically opposite flexural pivots offset by 90° to the first one, on the other hand.

In a conventional two-axis, dynamically tuned gyro the rotor is connected to the drive shaft of the motor through a gimbal, which is connected on the one hand to the drive shaft and on the other hand to the rotor through spring joints. With deflection of the gyro housing relative to the gyro rotor the spring joints would normally exert a torque on the gyro rotor, which causes this rotor to change its reference attitude in space. In a dynamically tuned gyro the tuning is selected such that the torques caused by the spring joints are compensated by dynamic torques. These dynamic torques are caused by an oscillating motion of the gimbal which occurs when the gyro housing is deflected relative to the space-fixed gyro rotor.

In such dynamically tuned gyro it is known to provide two or more concentrically arranged gimbals (U.S. Pat. No. 3,678,764). With appropriate selection of the moments of inertia of the gimbals errors may be eliminated which occur due to a "rectifier effect" with external vibrations at twice the gyro rotary speed. The gyro of U.S. Pat. No. 3,678,764 requires hight precision and thus high manufacturing expenditure.

By German Pat. No. 24 29 913 a gyro assembly with dynamically tuned gimbal suspension of the rotor on the drive shaft is known, in which the gimbal suspension comprises three gimbals, each of which is connected with the rotor and the shaft through flexural pivots angularly offset by 90°. The corresponding flexural pivots of different gimbals are offset by 120°. Gimbals are formed of cylindrical gimbal rings. They are connected with the rotor and the driving shaft through pairs of diametrically opposite flexural pivots. The gimbals are arranged concentrically one within the other. Also this construction is made of many individual parts and therefore expensive.

Furthermore cardan joints with spring elements are known, in which the spring elements are heavily restricted bending rods (German Pat. No. 12 81 216, German Pat. No. 19 47 893 and German Pat. No. 21 50 604). In these bending rods the range which may be deformed is reduced to a minimum. This causes high material tensions in the marginal zones, when the rod is deflected.

It is the object of the invention to form a gimbal suspension of the type described above such that it may be manufactured with low expenditure.

According to the invention this object is achieved in that
(d) the gimbals on the driving side and on the rotor side and the gimbal arrangement are formed by two coaxial, hollow-cylindrical rings, of which ($d_1$) the first ring has two pairs of peripheral, axially offset cuts, which
  ($d_{11}$) have ends forming angles, wherein
  ($d_{12}$) adjacent ends forming angles of the peripherical cuts of a pair overlap each other forming a leaf spring therebetween and
  ($d_{13}$) the two pairs of peripherical cuts are angularly offset by 90°, and
($d_2$) a second ring has two pairs of peripheral, axially offset cuts, which
  ($d_{21}$) have ends forming angles, wherein
  ($d_{22}$) the two sections forming angles at adjacent ends of the peripheral cuts of a pair are parallel forming a leaf spring therebetween, and
  ($d_{23}$) the two pairs of peripheral cuts are angularly offset by 90°, each leaf spring of one ring crossing a leaf spring of the other ring to form a flexural pivot,
(e) the portion of the first ring, located axially outside one pair of peripheral cuts of the first ring and the portions of the second ring, located axially outside the one pair of peripheral cuts of the second ring are interconnected to form the gimbal on the driving side and
(f) the portion of the first ring, located axially outside the other pair of peripheral cuts of the first ring and the portion of the second ring located axially outside the other pair of peripheral cuts of the second ring are interconnected to form the gimbal on the rotor side.

Such a gimbal suspension consists of lathe works only, in which the peripheral cuts may be provided, for example, by electroerosion. The erosion cuts start always at the outer contour of the lathe work. Thus it is not necessary to thread the erosion wire throught bores. No material pieces cut free are developed by the electroerosion of the peripheral cuts which pieces may cause the erosion wire to break. The erosion wire is active only during the advance phase. The processing time may thus be reduced further by fast return of the wire. It is possible without high expenditure to automate the application of the peripheral cuts to the gimbal suspension.

Furthermore the advantage results that two gimbals offset by 90° are obtained. This allows—contrary to systems with only one gimbal—a permanent compensation of the spring torques also when the rotor is deflected relative to the housing.

An embodiment of the invention will now be described in greater detail with reference to the accompanying drawings.

Figure 1:
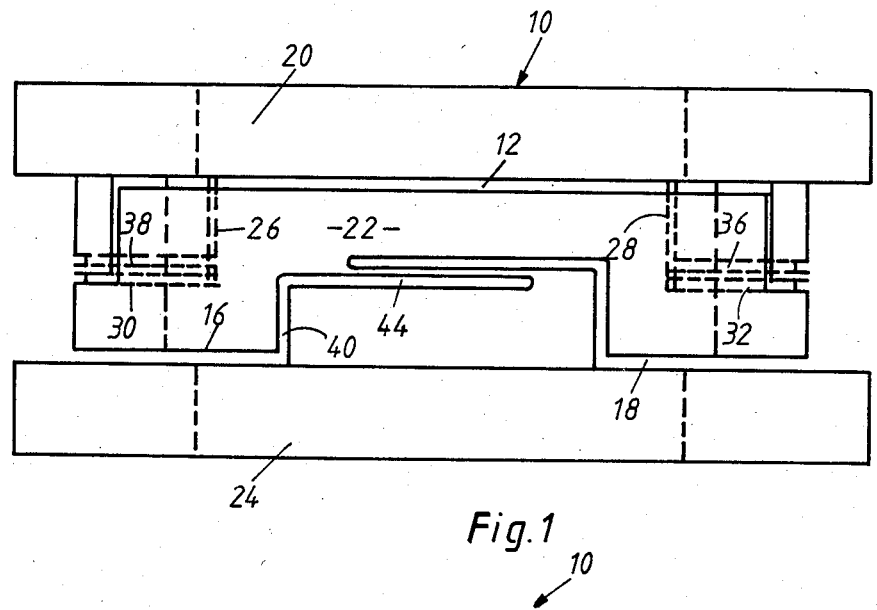
FIG. 1 shows a side view of a first hollow-cylindrical ring with peripheral cuts for forming a gimbal on the driving side and a gimbal on the rotor side and a first gimbal.

A first hollow-cylindrical ring 10 has a first pair of peripheral cuts 12,14 and a second pair of peripheral cuts 16,18. The pairs of peripheral cuts 12,14 and 16,18 are axially offset. They subdivide the first ring 10 in an upper annular portion 20, as viewed in FIG. 6, forming part of a gimbal on the rotor side, which will be described hereinbelow, a first gimbal 22 in the center and a lower annular portion 24, as viewed in FIG. 6, forming a gimbal on the driving side, which will be described hereinbelow.

Figure 2:
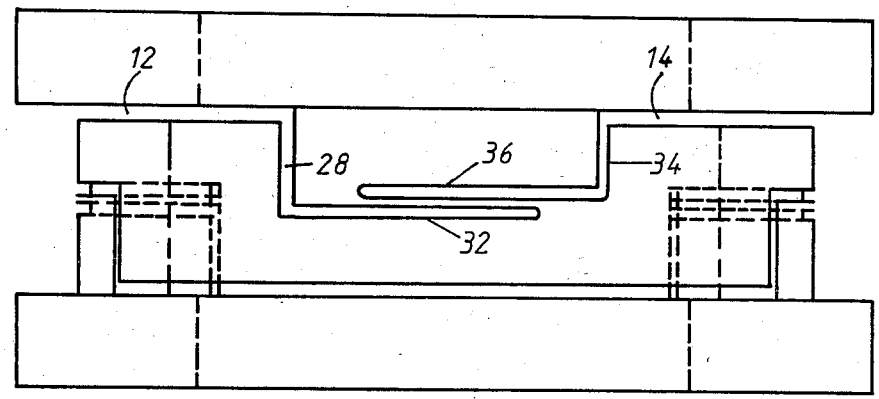
FIG. 2 shows a side view of this first ring displaced by 90°.

The peripheral cuts 12,14,16,18 extend through a little more than 180°. They have z-shaped ends terminating at the middle of the ring 10. The peripheral cut 12 has for example at its ends axial sections 26 and 28 extending downward in FIG. 6, which are followed in turn by legs 30 and 32, respectively, extending in peripheral direction. Correspondingly the peripheral cut 14 has at its ends sections like 34 in FIG. 2 extending axially downward in FIG. 2 or 6, which also are followed by legs 36 and 38 extending in peripheral direction.

Figure 6:
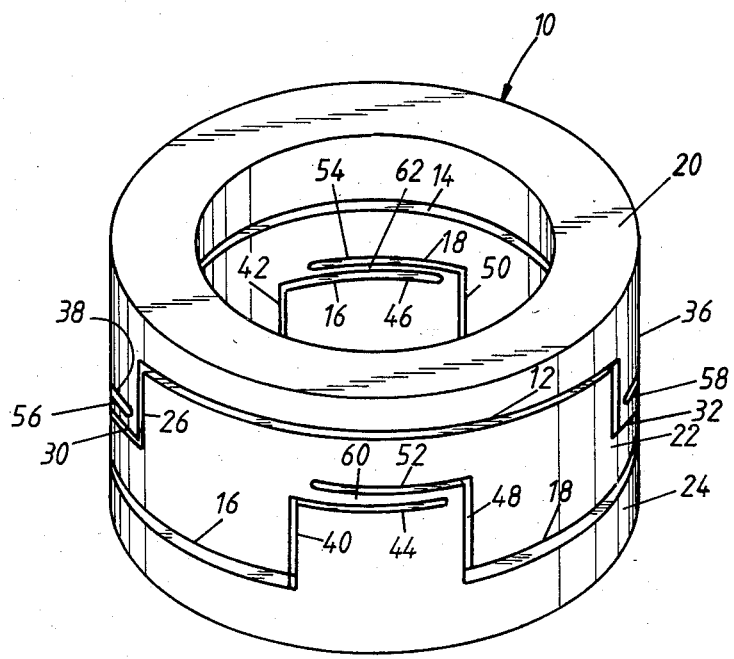
FIG. 6 is a schematic-perspective illustration of the first ring.

The peripheral cut 16 has at its ends sections 40 and 42 extending axially toward the middle, that is upward in FIG. 6, which are followed by legs 44 and 46, respectively, extending in peripheral direction. Correspondingly the peripheral cut 18 has at its ends sections 48 and 50 extending axially upward in FIG. 6, which are followed by legs 52 and 54, respectively, extending in peripheral direction. The two legs 30,38; 32,36 and 44,52; 46,54, respectively, offset toward the middle at adjacent ends of the periperal cuts 12,14 and 16,18, respectively, of a pair overlap forming a leaf spring 56,58 and 60,62, respectively, extending in peripheral direction. The two pairs of peripheral cuts 12,14 and 16,18 are angularly offset by 90°. Correspondingly the two pairs of diametrically opposite leaf springs 56,58 and 60,62 formed thereby are offset by 90°.

The center portions of the peripheral cuts 12 and 14 are located in one plane in the upper portion of the ring 10. In the same way the center portions of the peripheral cuts 16 and 18 are located in a plane in the lower portion of the ring 10. The legs 36,38 and 52,54 are located in a common plane, and the legs 30,32 and 44,46 are located in a common plane axially displaced a little relative to the plane of the legs 36 etc.

It may be seen that the annular portions 20 and 24 and the first gimbal 22 thereinbetween are formed out of a monolithic ring 10 by the peripheral cuts 12,14,16 and 18. The gimbal 22 is connected to the annular portion 24 through the two diametrically opposite leaf springs 60,62. The gimbal 22 is furthermore connected to the annular portion 20 though the two diametrically opposite leaf springs 56,58 and angularly offset by 90° relative to the leaf springs 60,62.

A second hollow-cylindrical ring 64 has two pairs of peripheral cuts 66,68 and 70,72. The peripheral cuts 66,68 are axially displaced relative to the peripheral cuts 70,72. By the pairs of peripheral cuts 66,68 and 70,72 the second ring 64 is subdivided into three portions, namely an annular portion 74 on the rotor side, a second gimbal 76 and an annular portion 78 on the driving side. In FIG. 6 the annular portion 78 on the driving side is connected to a driving shaft 80.

The peripheral cuts 66,68 and 70,72 extend through a little less than 180°. Its ends extend at a right angle toward the middle such that they form sections extending in axial direction. The peripheral cut 66 forms sections 82 and 84 extending in axial direction downward in FIG. 7. The peripheral cut 68 forms sections 86 and 88 extending in axial direction downward in FIG. 7. The peripheral cut 70 forms sections 90 and 92 extending in axial direction upward in FIG. 7, and the peripheral cut 72 forms corresponding sections extending in axial direction upward in FIG. 7, of which only one section 94 can be seen in FIG. 4. The two sections extending at a right angle at adjacent ends of the peripherical cuts of a pair are parallel and form a leaf spring extending in axial direction: The sections 82 and 86 of the peripheral cuts 66 and 68, respectively, form a leaf spring 98, and the sections 84 and 88 of the peripheral cuts 66 and 68, respectively, form a leaf spring 100. The sections 90 and 94 of the peripheral cuts 70 and 72, respectively, form a leaf spring 102. The sections 92 and 96 of the peripheral cuts 70 and 72, respectively, form a leaf spring 104. The two pairs of peripheral cuts 66,68 and 70,72 are angularly offset by 90°. Correspondingly the leaf springs 98,100 and 102,104 are also offset by 90°.

Figure 7:
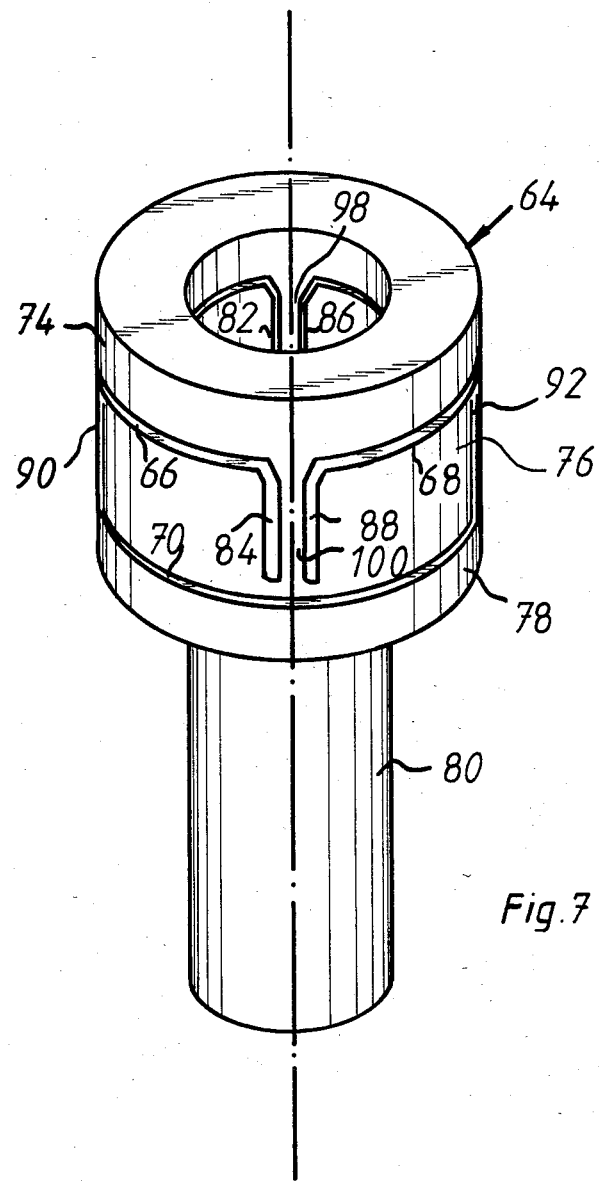
FIG. 7 is a schematic-perspective illustration of the second ring with the drive shaft.

It can be seen from FIG. 7 that the annular portion 74 on the rotor side is connected to the second gimbal 76 through the leaf springs 98 and 100. The gimbal 76 is connected to the annular portion 74 on the driving side through the leaf springs 102 and 104.

Figure 8:
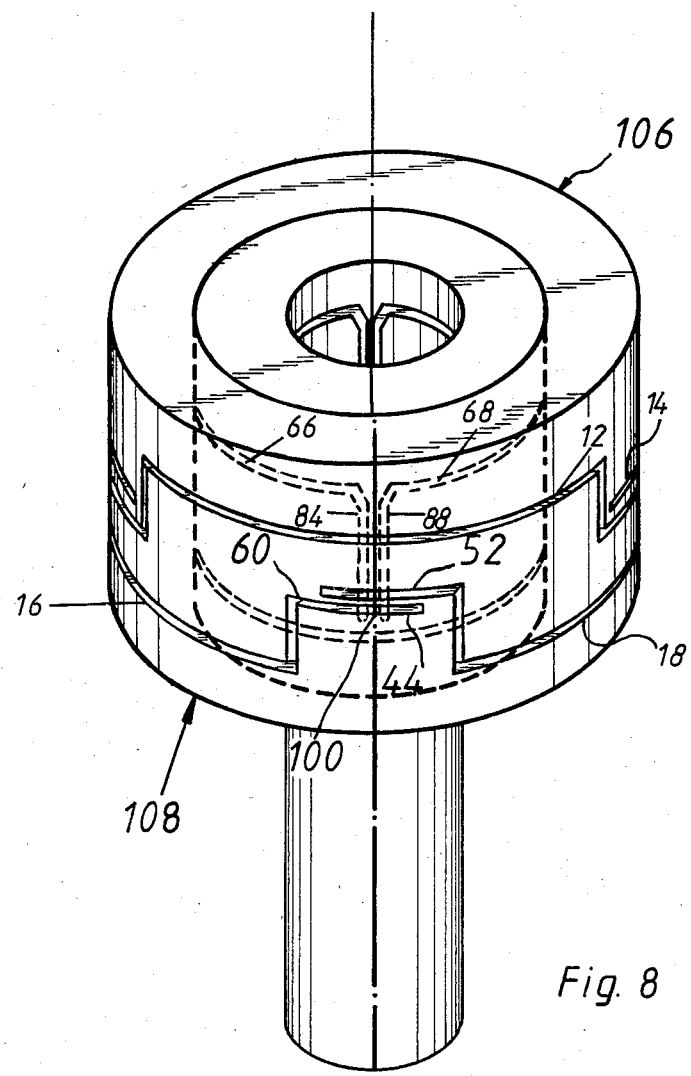
FIG. 8 is a schematic-perspective illustration of the gimbal suspension obtained by assembling the rings of FIGS. 6 and 7.

FIG. 8 shows the gimbal suspension in the assembled state.

The two hollow-cylindrical rings 10 and 64 are coaxially arranged, the ring 64 being located within the ring 10. The annular portion 74 is connected to the annular portion 20. These two annular portions 74 and 20 together form the gimbal 106 on the rotor side. The annular portion 78 is connected to the annular portion 24. These two annular portions 78 and 24 together form the gimbal 108 on the driving side. The two gimbals are coaxially arranged between the gimbals 106 and 108. The gimbals are connected to the gimbal 106 and 108 through the leaf springs.

As can be seen from FIG. 8, the hollow-cylindrical rings 10 and 64 are so arranged relative to each other that each leaf spring of one ring crosses a leaf spring of the other ring.

Figures 3, 4:
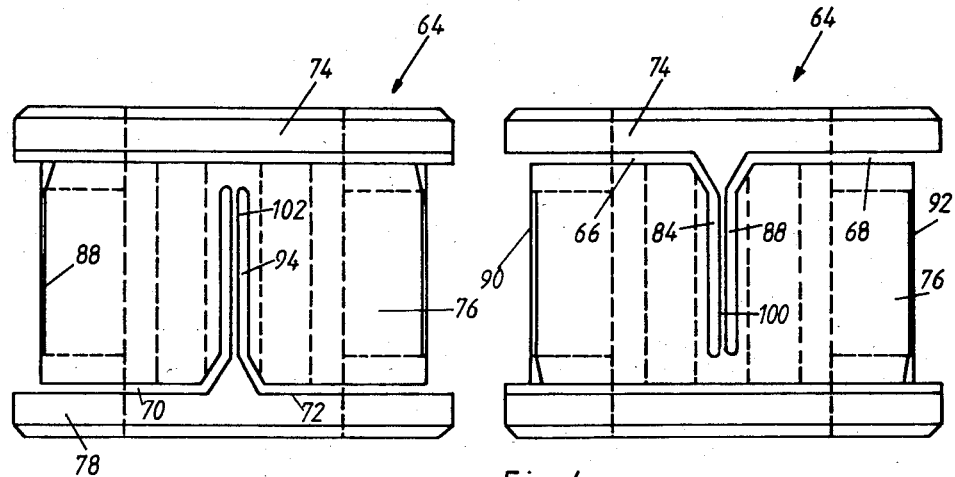
FIG. 3 shows a side view of a second hollow-cylindrical ring with peripheral cuts for forming the gimbal on the driving side and a gimbal on the rotor side and a second gimbal.
FIG. 4 shows a side view of this second ring displaced by 90°.

In FIG. 8 the leaf spring 60 extending in peripheral direction and connecting the annular portion 24 to the first gimbal is arranged crosswise to the leaf spring 100 extending in axial direction and connecting the annular portion 74 to the second gimbal 76. In a corresponding way not shown in FIG. 8, the leaf spring 62 is arranged crosswise to the leaf spring 98. In a similar way the leaf springs 56 and 58 extending in peripheral directions and connecting the annular portion 20 on the rotor side to the first gimbal 22 cross the leaf springs 102 and 104 extending in axial direction and connecting the annular portion 78 to the second gimbal 76. Thus four flexural pivots are formed in which respectively one leaf spring is connected to the gimbal 108 on the driving side and the other leaf spring is connected to gimbal 106 on the rotor side. Thus the ring 64 in the side view of FIG. 4 is mounted within the ring 10 of FIG. 1.

The arrangement is very rigid against translatory motions. The described construction is particularly suitable for miniaturization, as the gimbal suspension is obtained by cuts only, which can be provided by electroerosion with a width of for example 0.2 millimeters.

Only eight cuts are required to form four flexural pivots with a total of eight leaf springs. The cuts required for producing the leaf springs cause at the same time also the separation of the gimbals 22 and 76 from the annular portions 20,24 and 74,78, on the driving and on the rotor side, respectively.

Figure 5:
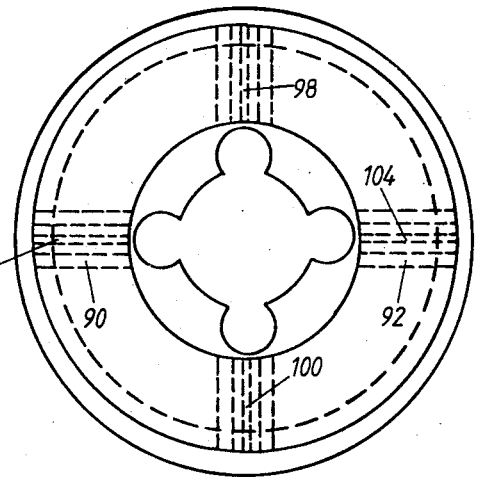
FIG. 5 shows a plan view of the second ring.

As can be seen from FIG. 5, the inner hollow-cylindrical ring 64 has a four-jaw receiver 110 on its inner side for a rod-shaped balancing mass.

In the described construction which two gimbals the differences of the moments of inertia of the gimbal, required for the dynamic spring torque compensation may be made larger than the difference corresponding to the dimensions of the gimbal suspension. The condition, however, is that an axial unbalance of the gimbal is put up with. In a system with two gimbals 22 and 76 an axial shear point displacement of the gimbal may however be compensated for by a mass displacement of the rotor without a sensitivity to vibrations synchronously with respect to rotary speed (2 ω-effect) occuring. This results in a simplification of the trimming of the difference of moments of inertia for the dynamic tuning and of the equalization of the unbalances of the gimbals.

I claim:

1. In a dynamically tuned gimbal suspension for supporting a gyro rotor with two degrees of freedom, comprising
   (a) a first generally hollow-cylindrical ring,
   (b) a second generally hollow-cylindrical ring arranged coaxially to said first ring with a common axis, said rings defining an axial direction and a peripheral direction and having a first end and a second end,
   (c) said first ring having a first and a second pair of axially spaced generally peripheral cuts,
   (d) each pair of said generally peripheral cuts of said first ring defining therebetween a pair of diametrically opposite, peripherally extending bending springs,
   (e) the pair of bending springs defined by said first pair of cuts of said first ring being angularly offset by 90° relative to the pair of bending springs defined by said second pair of cuts,
   (f) said second ring having a third and a fourth pair of axially spaced, generally peripheral cuts,
   (g) each pair of said generally peripheral cuts of said second ring defining therebetween a pair of diametrically opposite, axially extending bending springs,
   (h) the pair of bending springs defined by said third pair of cuts of said second ring being angularly offset by 90° relative to the pair of bending springs defined by said fourth pair of cuts,
   (i) said first and second pairs of cuts of said first ring dividing said first ring into a first ring portion adjacent said first end, a second ring portion adjacent said second end and a median first gimbal portion therebetween, said first ring portion being separated from said median first gimbal portion by said first pair of cuts and flexibly connected thereto through the pair of bending springs defined by said first pair of cuts, and said second ring portion being separated from said median first gimbal portion by said second pair of cuts and flexibly connected thereto through the pair of bending springs defined by said second pair of cuts,
   (j) said third and fourth pairs of cuts of said second ring dividing said second ring into a third ring portion adjacent said first end, a fourth ring portion adjacent said second end and a median second gimbal portion therebetween, said third ring portion being separated from said median second gimbal portion by said third pair of cuts and flexibly connected thereto through the pair of bending springs defined by said third pair of cuts, and said fourth ring portion being separated from said median second gimbal portion by said fourth pair of cuts and flexibly connected thereto through the pair of bending springs defined by said fourth pair of cuts,
   (k) the bending springs defined by said first pair of cuts of said first ring being arranged crosswise to the bending springs defined by said third pair of cuts of said second ring, and the bending springs defined by said second pair of cuts of said first ring being arranged crosswise to the bending springs defined by said fourth pair of cuts of said second ring,
   (l) said first ring portion and said third ring portion being interconnected to form a gimbal for connection to a gyro rotor and
   (m) said second ring portion and said fourth ring portion being interconnected to form a gimbal for connection to gyro rotor driving means,
the improvement comprising:
   (n) the cuts of said first pair of cuts of said first ring being symmetric with respect to a first plane passing through said axis, and being provided on opposite sides of said first ring,
   (o) the cuts of said second pair of cuts of said first ring being symmetric with respect to a second plane passing through said axis and orthogonal to said first plane, and being provided on opposite sides of said first ring,
   (p) each of said cuts of said first pair comprising a peripheral median portion near said first end, axial portions of equal lengths at both ends of said median portion communicating therewith and extending therefrom in generally axial direction towards said second end, and peripheral end portions communicating with one of said axial portions,
   (q) each of said cuts of said second pair comprising a peripheral median portion near said second end, axial portions of equal lengths at both ends of said median portion communicating therewith and extending therefrom in generally axial direction towards said first end, and peripheral end portions communicating with one of said axial portions,
   (r) with each pair of said first and second pair of cuts, the ends of the axial portions of one cut being axially offset relative to the ends of the axial portions of the other cut, and the adjacent peripheral end portions of the cuts overlapping in peripheral direction, whereby said peripherally extending bending springs are leaf springs formed between said overlapping peripheral end portions,
   (s) the cuts of said third pair of cuts of said second ring being symmetric with respect to said first plane and being provided on opposite sides of said second ring,
   (t) the cuts of said fourth pair of cuts of said second ring being symmetric with respect to said second plane and being provided on opposite sides of said second ring,
   (u) each of said cuts of said third pair comprising a peripheral median portion, which extends through slightly less than 180° near said first end, and axial end portions of equal lengths at both ends of said median portion communicating therewith and extending therefrom in an axial direction toward said second end, (v) each of said cuts of said fourth pair comprising a peripheral median portion, which extends through slightly less than 180° near said second end, and axial end portions of equal lengths at both ends of said medial portions communicating therewith and extending therefrom in an axial direction toward said first end, and (w) with each pair of said third and fourth pair of cuts, the axial end portions of one cut being slightly, peripherally spaced from the adjacent axial end portion of the other cut, whereby said axially extending bending springs are leaf springs formed between said adjacent axial end portions.

2. A dynamically tuned gimbal suspension as defined in claim 1, wherein (a) said peripheral median portions of said first pair of cuts of said first ring are located in a first radial plane, (b) said peripheral median portions of said second pair of cuts of said first ring are located in a second radial plane axially spaced from said first radial plane, (c) said peripheral median portions of said third pair of cuts of said second ring are located in said first radial plane and (d) said peripheral median portions of said fourth pair of cuts of said second ring are located in said second radial plane.

3. In a dynamically tuned gimbal suspension for supporting a gyro rotor with two degrees of freedom, comprising (a) a first generally hollow-cylindrical ring, (b) a second generally hollow-cylindrical ring arranged coaxially to said first ring with a common axis, said rings defining an axial direction and a peripheral direction and having a first end and a second end, (c) said first ring having a first and a second pair of axially spaced generally peripheral cuts, (d) each pair of said generally peripheral cuts of said first ring defining therebetween a pair of diametrically opposite, peripherally extending bending springs, (e) the pair of bending springs defined by said first pair of cuts of said first ring being angularly offset 90° relative to the pair of bending springs defined by said second pair of cuts, (f) said second ring having a third and a fourth pair of axially spaced, generally peripheral cuts, (g) each pair of said generally peripheral cuts of said second ring defining therebetween a pair of diametrically opposite, axially extending bending springs, (h) the pair of bending springs defined by said third pair of cuts of said second ring being angularly offset 90° relative to the pair of bending springs defined by said fourth pair of cuts, (i) said first and second pair of cuts of said first ring dividing said first ring into a first ring portion adjacent said first end, a second ring portion adjacent said second end and a median first gimbal portion therebetween, said first ring portion being separated from said median first gimbal portion by said first pair of cuts and flexibly connected thereto through the pair of bending springs defined by said first pair of cuts, and said second ring portion being separated from said median first gimbal portion by said second pair of cuts and flexibly connected thereto through the pair of bending springs defined by said second pair of cuts, (j) said third and fourth pairs of cuts of said second ring dividing said second ring into a third ring portion adjacent said first end, a fourth ring portion adjacent said second end and a median second gimbal portion therebetween, said third ring portion being separated from said median second gimbal portion by said third pair of cuts and flexibly connected thereto through the pair of bending springs defined by said third pair of cuts, and said fourth ring portion being separated from said median second gimbal portion by said fourth pair of cuts and flexibly connected thereto through the pair of bending springs defined by said fourth pair of cuts, (k) the bending springs defined by said first pair of cuts of said first ring being arranged crosswise to the bending springs defined by said third pair of cuts of said second ring, and the bending springs defined by said second pair of cuts of said first ring being arranged crosswise to the bending springs defined by said fourth pair of cuts of said second ring, (l) said first ring portion and said third ring portion being interconnected to form a gimbal for connection to a gyro rotor and (m) said second ring portion and said fourth ring portion being interconnected to form a gimbal for connection to gyro rotor driving means, the improvement comprising:

(n) the cuts of said first pair of cuts of said first ring being symmetric with respect to a first plane passing through said axis, and being provided on opposite sides of said first ring, (o) the cuts of said second pair of cuts of said first ring being symmetric with respect to a second plane passing through said axis and orthogonal to said first plane, and being provided on opposite sides of said first ring, (p) the cuts of said third pair of cuts of said second ring being symmetric with respect to said first plane and being provided on opposite sides of said second ring, (q) the cuts of said fourth pair or cuts of said second ring being symmetric with respect to said second plane and being provided on opposite sides of said second ring, (r) each pair of said cuts having a constant cut width, and (s) said bending springs being leaf springs defined by adjacent straight end portions of cuts of a respective pair of cuts.

* * * * *